United States Patent

[11] 3,626,007

| [72] | Inventors | Hermann Windel<br>Frankenthal;<br>Adolf Fischer, Mutterstadt, both of Pfalz, Germany |
|---|---|---|
| [21] | Appl. No. | 729,558 |
| [22] | Filed | May 16, 1968 |
| [45] | Patented | Dec. 7, 1971 |
| [73] | Assignee | Badische Anilin & Soda Fabrik Aktiengesellschaft<br>Ludwigshafen am Rhine, Germany |
| [32] | Priority | May 27, 1967 |
| [33] | | Germany |
| [31] | | P 16 42 225.6 |

[54] HYDRAZODICARBOXYLIC AMIDES AND HERBICIDES CONTAINING SAME
2 Claims, No Drawings

[52] U.S. Cl. .................................................... 260/554, 71/120

[51] Int. Cl. .................................................... C07c 133/02

[50] Field of Search ........................................... 260/554

[56] References Cited
FOREIGN PATENTS

976,552  11/1964  Great Britain ................ 260/554

OTHER REFERENCES

Beaver et al., J. Am. Chem. Soc., Vol. 79, pages 1236, 1237 and 1244 (1957)

*Primary Examiner*—Leon Zitver
*Assistant Examiner*—Michael W. Glynn
*Attorney*—Johnston, Root, O'Keeffe, Keil, Thompson & Shurtleff ABSTRACT: Substituted hydrazodicarboxylic amides, particularly those substituted by phenyl or cycloalkyl, and methods for controlling unwanted plant growth with said compounds.

HYDRAZODICARBOXYLIC AMIDES AND HERBICIDES CONTAINING SAME

The present application relates to valuable new substituted hydrazodicarboxylic amides and methods for treating unwanted plant growth with said compounds without damaging the crop plants.

It is known that urea derivatives, e.g. 1-p-chlorophenyl-3,3-dimethylurea, may be used as herbicides. Their action, however, is not satisfactory.

An object of the present invention is to provide valuable new hydrazodicarboxylic amides, particularly those substituted by phenyl or cycloalkyl. Another object of the invention is to provide a method of controlling unwanted plant growth using substituted hydrazodicarboxylic amides. A further object of the invention is to control unwanted plant growth using hydrazodicarboxylic amides without injuring the crop plants.

These and other objects of the invention are achieved with substituted hydrazodicarboxylic amides having the formula

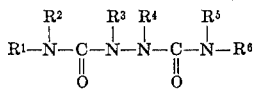

in which $R^1$ denotes a phenyl radical which may bear one or more halogen atoms, or lower alkyl, lower alkoxy, lower haloalkyl or nitro groups as substituents, or a cycloaliphatic radical which may be substituted by one or more halogen atoms or lower alkyl groups, $R^2$, $R^3$, $R^4$ and $R^5$ are identical or different and denote hydrogen or a saturated or unsaturated aliphatic radical which may be substituted by one or more halogen atoms, and $R^6$ denotes a phenyl radical which may bear one or more halogen atoms or lower alkyl, lower alkoxy or lower haloalkyl groups as substituents, a cycloaliphatic radical having three to eight carbon atoms in the cycloaliphatic ring which may be substituted by halogen atoms or lower alkyl groups, or a saturated or unsaturated radical which may be substituted by a halogen atom or an acetoxy radical. These compounds are also better tolerated by Indian corn, cereals, cotton, rice and beets than is 1-p-chlorophenyl-3,3-dimethylurea.

The active ingredients according to the invention may be prepared from the corresponding hydrazine derivatives which may be reacted in one or two steps with carbamyl halides, preferably the chlorides, if desired in the presence of an agent binding hydrogen halide, or with isocyanates.

The preparation of the active ingredients according to the invention is illustrated by the following experiments (parts by weight).

1a

A solution of 15.5 parts of m-chlorophenyl isocyanate in 50 parts of ether is gradually introduced into a solution of 4.6 parts of methylhydrazine in 100 parts of ether while constantly stirring at 10° to 20° C. The mixture is stirred for six hours at 20° to 30° C. and then the 2-methyl-4-(m-chlorophenyl)-semicarbazide which is formed is filtered off; melting point 153° to 155° C. (white crystals). 2-methyl-4-(2,5-dichlorophenyl)-semicarbazide (m.p. 172° to 174° C.) may be prepared analogously by using 18.9 parts of 2,5-dichlorophenyl isocyanate instead of 15.5 parts of m-chlorophenyl isocyanate for the reaction.

1b

A solution of 5.7 parts of methyl isocyanate in 50 parts of benzene is gradually introduced while stirring at 20° C. into a solution of 20.0 parts of 2-methyl-4-(m-chlorophenyl)-semicarbazide and 0.5 part of pyridine in 100 parts of benzene. The mixture is then heated to 60° C. and kept at this temperature for six hours while stirring and the 1-(m-chlorophenyl)-3,6-dimethylhydrazodicarboxylic amide which is formed is then filtered off; the compound has a melting point of 194° to 196° C. and the following structural formula:

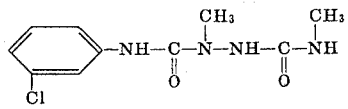

2

A mixture of 23.4 parts of 2-methyl-4-2,5-dichlorophenyl-semicarbazide 10 parts of pyridine and 5.7 parts of methyl isocyanate is heated for 8 hours at 80° C. in an autoclave. The reaction product is then stirred with 100 parts of water, filtered and left to dry in the air. 1-(2,5-dichlorophenyl)-3,6-dimethylhydrazodicarboxylic amide is obtained with a melting point of 214° to 216° C.

3

A mixture of 4.6 parts of methylhydrazine in 100 parts of ether is slowly added to a solution of 5.7 parts of methylisocyanate in 50 parts of ether while continually stirring at 10° to 20° C. The mixture is then stirred for 3 hours at 20° to 30° C. and the 2,4-dimethylsemicarbazide which is formed is filtered off; it has a melting point of 148° to 150° C.

10.3 parts of this 2,4-dimethylsemicarbazide and 0.5 parts of pyridine are dissolved in 100 parts of benzene and the mixture is then mixed with a solution of 15.4 parts of m-chlorophenyl isocyanate in 50 parts of benzene while stirring at about 20° C. The whole is then heated for six hours at 60° C. while stirring and then the 1-(m-chlorophenyl)-4,6-dimethylhydrazodicarboxylic amide is filtered off; when recrystallized from methanol the compound has a melting point of 204° to 206° C.

1-(2,5-dichlorophenyl)-4,6-dimethylhydrazodicarboxylic amide (melting point 193° to 194° C.) may obtained in an analogous manner by using 518.8 parts of 2,5-dichlorophenyl isocyanate instead of 5.7 parts of methyl isocyanate and further reacting the semicarbazide as above.

If isopropyl isocyanate or p-ethoxyphenyl isocyanate is used instead of methyl isocyanate, 2-methyl-4-isopropylsemicarbazide or 2-methyl-p-ethoxyphenylsemicarbazide is obtained and by further reaction 4-methyl-6-isopropylhydrazodicarboxylic amide or 4-methyl-6-p-ethoxyphenylhydrazodicarboxylic amide derivatives.

4

A solution of 10.75 parts of dimethylcarbamyl chloride in 50 parts of ether is slowly added to a solution of 9.2 parts of methylhydrazine in 100 parts of ether while stirring at 10° to 20° C. The mixture is then heated for 6 hours at 20° to 30° C. while stirring and filtered. The residue is the hydrochloride of methylhydrazine. The filtrate is fractionally distilled and 2,4,4-trimethylsemicarbazide with a boiling point of 74° to 78° C. at 2 mm. is obtained.

5.85 parts of this 2,4,4-trimethylsemicarbazide is dissolved in 100 parts of benzene and mixed with 6 parts of phenyl isocyanate while stirring at about 20° C. The mixture is kept at 60° C. for six hours while stirring and the 1-(phenyl)-4,6,6-trimethylhydrazodicarboxylic amide which is formed is filtered off; the compound has a melting point of 168° to 170° C. and the following structural formula:

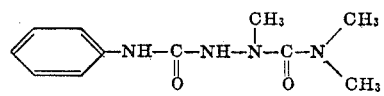

The herbicides according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points such as kerosene or diesel oil, coal tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders by adding water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possibly solvent.

The herbicides may also be applied in granulated form.

Insecticides, fungicides, bactericides and other herbicides may be added to the herbicides according to the invention and the latter may also be mixed with fertilizers.

Dusts may be prepared by mixing or grinding the active ingredients with a solid carrier.

The following examples illustrate the application of the herbicides according to the invention.

EXAMPLE 1

In a greenhouse pots with a diameter of 8 cm. were filled with loamy sandy soil and seeds of Indian corn (Zea mays), cotton (Gossypium sp.), beet (Beta vulgaris), cabbage (Brassica sp.). annual meadow grass (Poa annua), slender foxtail (Alopecurus myosuroides), wild oats (Avena fatua) and silky bent grass (Agrostis spica venti) were sown therein. The soil prepared in this way was treated with 1-(m-chlorophenyl)-4,6-dimethylhydrazodicarboxylic amide (I) and, for comparison, with 1-p-chlorophenyl-3,3-dimethylurea (II), each at a rate of 3 kg. per hectare dispersed in 500 liters of water. After 3 to 4 weeks it was observed that I was better tolerated than II by the crop plants.

The results of the experiment can be seen in the table below.

|  | Active ingredient | |
|---|---|---|
|  | I | II |
| Crop plants: | | |
| Indian Corn | 10 | 20-30 |
| Cotton | 10 | 20 |
| Beet | 0-10 | 90-100 |
| Cabbage | 10 | 100 |
| Unwanted plants: | | |
| Annual meadow grass | 100 | 90-100 |
| Slender foxtail | 90-100 | 80-90 |
| Wild oats | 90-100 | 90 |
| Silky bent grass | 100 | 100 |

0 = no action
100 = complete kill

EXAMPLE 2

The plants Indian corn (Zea mays), rice (Oryza sativa), barley (Hordeum vulgare), wheat (Triticum sativum), small nettle (Uritica urens), common chickweed (Stellaria media), white goosefoot (Chenopodium album), wild mustard (Sinapis arvensis) and chamomile (Matricaria chamomilla) were sprayed at a growth height of 3 to 18 cm. with 1-(3,4-dichlorophenyl)-4,6-dimethylhydrazodicarboxylic amide (I) and, for comparison, with 1-p-chlorophenyl-3,3-dimethylurea (II), each at a rate of 3 kg. per hectare dispersed in 500 liters of water. After 3 to 4 weeks it was observed that I was better tolerated than II by the crop plants.

|  | Active ingredient | |
|---|---|---|
|  | I | II |
| Crop plants: | | |
| Indian corn | 0 | 20-30 |
| Rice | 10 | 70 |
| Barley | 0-10 | 70 |
| Wheat | 0-10 | 90 |
| Unwanted plants: | | |
| Small nettle | 100 | 100 |
| Chickweed | 90-100 | 90-100 |
| White goosefoot | 90-100 | 90-100 |
| Wild mustard | 100 | 100 |
| Chamomile | 90-100 | 90-100 |

0 = no action
100 = complete kill

The following compounds have the same biological action as I in example 1 and 2:

1-phenyl-4,6-dimethylhydrazodicarboxylic amide 1-(m-chlorophenyl)-4-methyl-6-ethylhydrazodicarboxylic amide 1-(2,5-dichlorophenyl)-4,6-dimethylhydrazodicarboxylic amide m.p. 193° to 194° C.

1-(o-chlorophenyl)4-methyl-6-allylhydrazodicarboxylic amide 1-(phenyl)-4,6,6-trimethylhydrazodicarboxylic amide m.p. 168° to 170° C.

1-(p-chlorophenyl)-3,6-dimethylhydrazodicarboxylic amide 1-(o-chlorophenyl)-3,6-dimethylhydrazodicarboxylic amide 1-(3,4-dichlorophenyl)-3,6-dimethylhydrazodicarboxylic amide 1-(p-ethoxyphenyl)-3-methyl-6-(3,4-dichlorophenyl)-hydrazodicarboxylic amide 1-phenyl-4-methyl-6-isopropylhydrazodicarboxylic amide m.p. 198° to 200° C.

1-(m-chlorophenyl)-4-methyl-6-isopropylhydrazodicarboxylic amide m.p. 196° to 198° C.

1-(m-chlorophenyl)-4-methyl-6-acetoxymethylhydrazodicarboxylic amide m.p. 132° to 134° C.

1-(m-chlorophenyl)-4-methyl-6-p-chlorophenylhydrazodicarboxylic amide m.p. 198° to 200° C.

1-(3,4-dichlorophenyl)-4-methyl-6-o-ethoxyphenyl-hydrazodicarboxylic amide m.p. 216° to 218° C.

1-(2,5-dichlorophenyl)-4-methyl-6-p-ethoxyphenyl-hydrazodicarboxylic amide m.p. 84° to 86° C.

1-(2,5-dichlorophenyl)-4-methyl-6-o-ethoxyphenyl-hydrazodicarboxylic amide m.p. 105° to 113° C.

1-(cyclododecyl)-4-methyl-6-p-ethoxyphenylhydrazodicarboxylic amide semisolid substance

We claim:
1. 1-(m-chlorophenyl)-4,6-dimethylhydrazodicarboxylic amide.
2. 1-(3,4-dichlorophenyl)-4,6-dimethylhydrazodicarboxylic amide.

* * * * *